Oct. 4, 1966  R. M. PAGE  3,277,470
THREE DIMENSIONAL RADAR SYSTEM
Filed Feb. 27, 1946  2 Sheets-Sheet 1
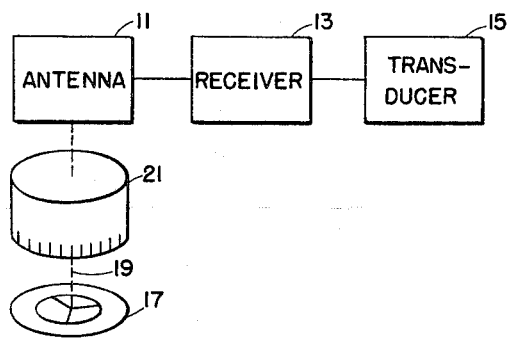
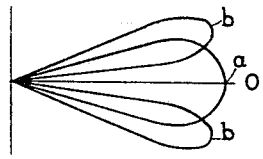
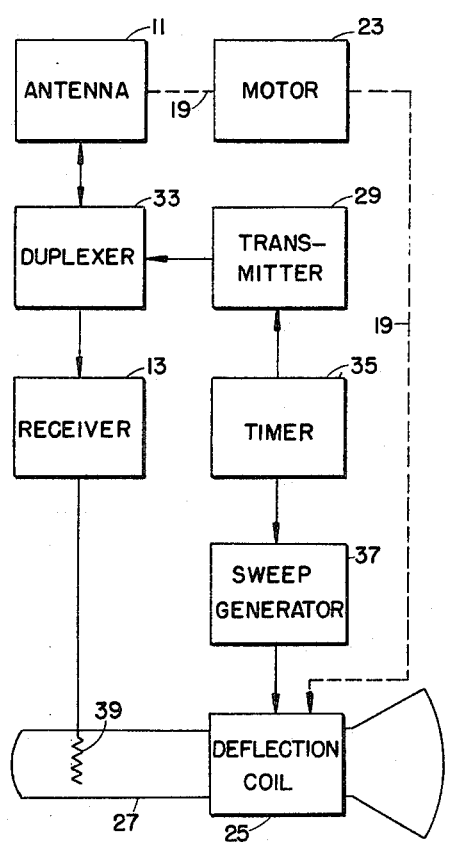
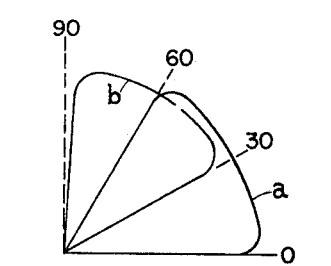
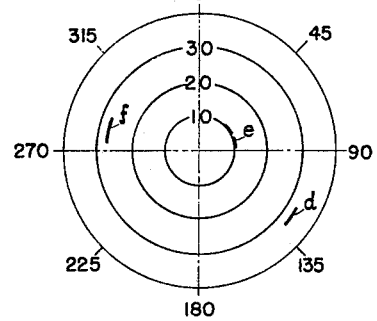
Inventor
ROBERT M. PAGE
M. O. Hayes
By
Attorney Oct. 4, 1966  R. M. PAGE  3,277,470

THREE DIMENSIONAL RADAR SYSTEM

Filed Feb. 27, 1946  2 Sheets-Sheet 2

Inventor
ROBERT M. PAGE

By M. O. Hayes

Attorney

United States Patent Office 3,277,470
Patented Oct. 4, 1966

3,277,470
THREE DIMENSIONAL RADAR SYSTEM
Robert M. Page, Washington, D.C.
(6715 Norview Court, Springfield, Va. 22150)
Filed Feb. 27, 1946, Ser. No. 650,583
5 Claims. (Cl. 343—7.9)

The invention described herein may be manufactured and used by or for the government of the United States of America for governmental purposes without the payment of any royalty thereon or therefor.

This invention relates to radio direction finding apparatus and more particularly to such apparatus including means for determining both the azimuth and the elevation of sources of radio signals.

An object of the invention is to provide a radio direction finding apparatus for determining simultaneously the azimuth and elevation of a source of radio signals.

Another object of the invention is to provide in a radio echo ranging and direction finding apparatus means for providing simultaneous indications of the range, azimuth and elevation of remote objects.

A further object of the invention is to provide a method of indicating simultaneously the azimuth and elevation of sources of radio signals.

Figure 6:
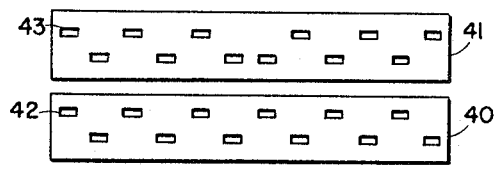
Figure 7:
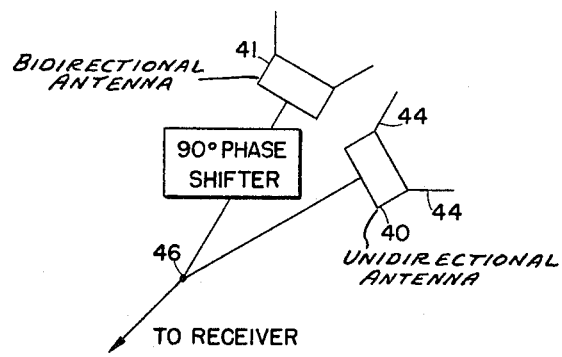

Other objects, features and advantages of the invention will be apparent from a consideration of the following description and of the accompanying drawings, in which FIG. 1 is a diagram of a direction finding system incorporating the invention, FIG. 2 is a polar coordinate graph of the azimuthal directivity of the antenna shown in FIG. 1, FIG. 3 is a polar coordinate graph of the directivity of the antenna in the vertical plane, FIG. 4 is a simplified diagram of a radio echo ranging and direction finding apparatus incorporating the invention, FIG. 5 shows the form of visual indication provided by the apparatus shown in FIG. 4, FIG. 6 is a front view of an exemplary embodiment of an antenna suitable for use as a component of the apparatus, and FIG. 7 is a diagram illustrating means for connecting the antenna to the apparatus.

In accordance with the invention, one form thereof consists of a radio direction finding apparatus comprising an antenna having distinctive azimuthal directive characteristics simultaneously in each of a plurality of sectors of elevation. By determining the distinctive directive characteristic effective in the reception of any given signal, the elevation of the source of the signal may be found by reference to the known directivity characteristics of the antenna.

In another form, the invention provides a radio echo ranging and direction finding apparatus comprising an antenna having distinctive azimuthal directive characteristics simultaneously in each of a plurality of sectors of elevation, and means for providing a visual indication of the range and azimuth of sources of echo signals and of the distinctive directive characteristic effective in the reception of the signals. The two forms of the invention hereinafter described exemplify the novel method of radio direction finding provided by the invention.

Referring now to FIG. 1, there is shown a simplified diagram of a radio direction finding apparatus comprising a rotatable antenna 11, a receiver 13, and a transducer 15. The antenna 11 is rotatable about a vertical axis by mechanical means which may comprise a handwheel 17 and a shaft 19 which couples the handwheel 17 to the antenna structure. The angular position of the antenna may be indicated by a scale 21 graduated in angular units and attached to the shaft 19. Signals intercepted by the antenna 11 are detected and amplified by the receiver 13 and delivered to the transducer 15 which converts the signals into audible or visible effects of magnitude varying directly as the intensity of the signals.

The azimuthal directivity of the antenna 11 is illustrated by the polar coordinate graph of FIG. 2 in which curve *a* represents the azimuthal directivity of the antenna 11 in a sector of angular elevation between zero and, for example, sixty degrees. Curve *b* represents the azimuthal directivity of the antenna 11 in a high angle sector between, for example, thirty and ninety degrees. It will be noted that curves *a* and *b* are symmetrically disposed about a common vertical plane O. Curve *a* has maximum value in the plane O, while curve *b* has a minimum value in the direction O and two maxima at equal angles divergent from the direction O. The azimuthal sector enclosed by curve *b* is greater than that of curve *a*. A better understanding of the directive characteristics of the antenna 11 as described above may be had by reference to FIG. 3, which is a polar coordinate graph of the directivity of antenna 11 in the vertical plane.

It will now be apparent that when the receiver 13 is tuned to a given signal the relative magnitude of the effect produced by transducer 15 varies as the antenna 11 is turned about a vertical axis, due to the directive characteristics of the antenna 11 hereinbefore described. By observing the manner of the variation of signal intensity as the antenna is turned the directive characteristic effective in the reception of the signal may be determined. Simultaneously the azimuth of the signal source may be noted by reading the angular scale 21.

As an exemplary operation, suppose that as the antenna 11 is turned through a wide sector two signal intensity maxima are observed and the antenna bearing at the minimum between the two maxima is read on the scale 21 as 255 degrees. By reference to FIG. 2, the azimuth of the signal source is 255 degrees. By reference to FIG. 3 it is found that the elevation of the signal source lies between 60 and 90 degrees.

Similarly, when the elevation of the signal source is within the sector between zero and thirty degrees, the indication will be a single maximum as the antenna is turned. Within the sector between thirty and sixty degrees, the indication will be a single maximum but broader than in the previous instance, due to the overlapping of curves *a* and *b*.

Referring now to FIG. 4, an echo ranging and direction finding apparatus comprises an antenna 11 rotatable by a motor 23 through a shaft 19 which synchronously rotates the deflection coil 25 enclosing the yoke of a cathode ray tube 27. The antenna 11 is electrically coupled to a transmitter 29 and a receiver 13 through a duplexer 33 which serves to prevent the dissipation of transmitter output power in the receiver during the operation of the transmitter 29 and to pass signal power intercepted by the antenna 11 to the receiver during intervals when the transmitter is not operating. A timer 35 generates periodic electrical impulses which energize the transmitter 29 and simultaneously initiate operation of a sweep generator 37. The sweep generator 37 produces a changing current in the deflection coil 25 which causes the electron beam of the cathode ray tube 27 to leave its normal center position and traverse the screen of the tube 27. The rate of deflection of the beam is determined by the rate of change of current through the deflection coil 25. Thus, the radial position of the beam at any instant is a measure of the elapsed time since the initiation of transmitter operation. The timer 35 energizes the transmitter 29 and the sweep generator 37 at a rate which is high relative to the frequency of rotation of the coil 25 and the antenna 11.

The transmitter 29 produces short pulses of radio frequency energy in response to the impulses from the timer 35. The energy passes through duplexer 33 to the antenna 11 where it is propagated into space in accordance with the directivity characteristics of the antenna 11. Energy reflected from a remote object and returned to the antenna 11 passes through the duplexer to the receiver 13. The output of the receiver is applied as a positive impulse to the control grid 39 of tube 27 resulting in an increase of the electron beam intensity during the receipt of a reflected pulse. Due to the sweep and the elapsed time between transmission of a pulse and receipt of a reflected pulse, the received pulse is indicated by a spot of increased brilliance on the screen of tube 27. The distance of the spot from the center of the screen is a measure of the range of the remote object. Due to the rotation of the antenna and its directivity, the angular position of the spot is a measure of the azimuth of the remote object. In addition, the distinct azimuthal directivity characteristic effective in the reception of the reflected energy is indicated by the corresponding distinct characteristics of the spot, as is shown in FIG. 5.

FIG. 5 shows the form of visual indication provided on the screen of tube 27. At $d$ is shown an indication of a remote object at a range of about 34 miles, azimuth 125 degrees, and elevation between zero and 30 degrees. At $e$ is shown an indication of a remote object at a range of 10 miles, azimuth 45 degrees, and elevation between 60 and 90 degrees. At $f$ is shown an indication of a remote object at a range of 28 miles, azimuth 285 degrees, and elevation between 30 and 60 degrees.

A suitable embodiment of antenna 11 is shown in FIGS. 6 and 7. The antenna 11 may comprise a pair of wave guides 40, 41, each having a plurality of apertures in the form of slots 42, 43, respectively. The slots 42 in wave guide 40 are arranged alternately on each side of the electrical axis of the wave guide and are spaced longitudinally along the guide 40 so that all of the slots 42 are cophasal. The slots 43 in wave guide 41 are similarly arranged except that half of the slots 43 are out of phase relative to the other half. The longitudinal axis of guides 40, 41 are positioned horizontally. Thus, the azimuthal directivity of the antenna 11 is determined by the number and phasing of the slots 42, 43. The slots 42 effect azimuthal directivity in accordance with curve $a$ (FIG. 2). The slots 43 effect azimuthal directivity in accordance with curve $b$ (FIG. 2).

Additional details of the antenna 11 are shown in FIG. 7, which shows the arrangement of the guides 40, 41 in the vertical plane. In order to provide suitable vertical plane directivity (FIG. 3), a pair of divergent plane conductors 44 are attached to the wave guide 40 parallel to the horizontal axis thereof. The conductors 44 constitute an electromagnetic horn which shapes the vertical plane directivity of the antenna 11 in accordance with curve $a$ (FIG. 3). A pair of plane conductors attached to wave guide 41 function similarly to effect vertical directivity in accordance with curve $b$ (FIG. 3). The wave guides 40, 41 are coupled to a common point 46 for connection to receiver 13. In order to effect symmetrical overlapping of the directive patterns of guides 40 and 41, a phase shift of the order of 90 degrees is introduced between the two guides 40, 41. This phase shift may be accomplished by means of a 90 degree phase shifter connected between point 46 and guide 41. The antenna shown in FIGS. 6 and 7 is particularly well adapted for use at ultra-high frequencies.

It will be understood that the invention is not limited by the exemplary embodiments herein illustrated and described and that the scope of the invention is to be determined by reference to the appended claims.

What is claimed is:

1. In an echo ranging apparatus, means for providing simultaneous indication of the range, azimuth and elevation of remote objects comprising, an antenna having a different number of azimuthal directivity lobes in each of a plurality of sectors of elevation, means for providing a visual plot of the range versus the azimuth of each remote object from which echo signals are received by the antenna and simultaneously a visual indication of the number of lobes effective in the reception of each echo signal.

2. In a direction finder, mounting means for recurrently sweeping an antenna through a predetermined azimuthal angle, an antenna carried by said mounting means, said antenna being sharply directional in azimuth and directionally operative over a first sector of the elevation quadrant from the horizon to the zenith to detect an incoming signal once only during a sweep cycle, said antenna being directionally operative over at least one other sector of the elevation quadrant to detect an incoming signal more than once during a sweep cycle, said antenna being directionally operative in each of a plurality of sectors throughout a major portion of the elevation quadrant, and means coupled to the antenna responsive to the number of times a signal source is swept during a sweep cycle to provide an indication of the elevation of the source of said incoming signal.

3. In an echo ranging apparatus; means for generating discrete wave trains; radiator means for propagating the wave trains; receiver means for the wave trains reflected from a remote object having distinctive azimuthal directive characteristics simultaneously in a plurality of sectors of elevation comprising, a pair of waveguides, one of the guides having a group of cophasal radiating slots, the other of the guides having two oppositely phased groups of cophasal slots, and reflector means positioned with respect to each of said guides to direct the radiation from each of said guides to different sectors of elevation; and an indicator for providing a visual plot of the range versus azimuth of each remote object from which reflected wavetrains are intercepted by the receiver means.

4. A radio direction finder for simultaneously indicating azimuth and elevation of a distant source of signal comprising, antenna means having sensitive receiving sectors throughout a major portion of the elevation quadrant between the horizon and the zenith, one of the sectors having a finite azimuth width with substantial sensitivity throughout, and a second sector having a finite azimuth width and including a null portion of substantially zero sensitivity intervening in azimuth between two spaced portions of substantial sensitivity, means operative to sweep the antenna directivity recurrently in azimuth such that the first and second sectors are oriented for the reception of a radio signal progressively through space sectors distinct throughout the sweep, a signal received during the sweep by the second sector being characterized by a substantial antenna pulse output interrupted during coincidence of the null sector portion with the signal direction and a signal received during the sweep by the first sector being characterized by a coherent substantial antenna pulse output, and a selectively responsive indicator coupled to the antenna means operative dependently on the antenna output pulse amplitude variation during reception to provide an indication of the azimuth and elevation of the distant source of signal.

5. In an echo ranging system, a directive antenna rotatably journalled for cyclic rotation in azimuth, said antenna having distinctive directional characteristics at different elevations whereby said antenna sweeps remote targets in one portion of the elevation quadrant between the horizon and the zenith only once during each rotation cycle of the antenna and sweeps remote targets in another portion of the elevation quadrant more than once during each rotation cycle of the antenna, means for rotating said antenna through a selected angle in azimuth, and an indicator coupled to the antenna selectively responsive to the number of times a target is swept during each rotation cycle of the antenna to provide an indication of the elevation of said remote target.

References Cited by the Examiner
UNITED STATES PATENTS

| | | | |
|---|---|---|---|
| 2,097,072 | 10/1937 | Lock | 343—108 |
| 2,165,256 | 7/1939 | Hansell | 250—11.37 |
| 2,405,930 | 8/1946 | Goldberg | 250—1.62 |
| 2,421,028 | 5/1947 | King | 250—1.60 |
| 2,422,182 | 6/1947 | Bryant | 250—1.62 |
| 2,426,183 | 8/1947 | Deloraine | 343—16 |
| 2,480,829 | 9/1949 | Barrow | 343—11 |
| 2,509,207 | 5/1950 | Busignies | 343—11 |
| 2,513,338 | 7/1950 | Litchford | 250—33.65 |
| 2,526,675 | 10/1950 | Litchford | 250—33.65 |
| 2,536,112 | 1/1951 | Varian | 343—108 |
| 2,704,843 | 3/1955 | Longacre | 343—11 |

CHESTER L. JUSTUS, *Primary Examiner.*

SAMUEL YAFFEE, NORMAN H. EVANS, FREDERICK M. STRADER, WALTER W. BURNS,
*Examiners.*

J. W. GALLAGHER, R. D. BENNETT,
*Assistant Examiners.*